Nov. 11, 1969   K. V. KORDESCH   3,477,877

FUEL CELL

Filed July 30, 1962

INVENTOR.
KARL V. KORDESCH
BY
*John R Hoherty*
ATTORNEY

United States Patent Office 3,477,877
Patented Nov. 11, 1969

3,477,877
FUEL CELL
Karl V. Kordesch, Lakewood, Ohio, assignor to Union Carbide Corporation, a corporation of New York
Continuation-in-part of applications Ser. No. 764,342 and Ser. No. 764,359, Sept. 30, 1958. This application July 30, 1962, Ser. No. 213,245
Int. Cl. H01m 27/04
U.S. Cl. 136—86    13 Claims This application is a continuation-in-part of applications Ser. Nos. 764,342 and 764,359, both filed Sept. 30, 1958, and both now abandoned.

The invention concerns a fuel cell, and particularly refers to an improved electrode construction for such a cell.

A fuel cell may be considered as a primary galvanic cell, the basic reaction of which is the electrochemical oxidation of a fuel. Fuel cells, however, differ from ordinary primary cells, such as the Le Clanche dry cell, in that the fuel and the oxidant are generally introduced continuously into the cell electrodes during production of electricity. In fuel cells, the electrodes and the electrolyte should, in theory at least, maintain a constant value while the fuel and oxidant react electrochemically and the electricity and product of reaction are removed from the cell.

Many kinds of fuels and oxidants have been proposed in the past, including solids, liquids, and gases, and each type is accompanied with its own particular problems. The present invention concerns those cells using at least in part a gas as the fuel or oxidant. Such cells must have for the gas electrode a construction which provides a gas-electrolyte-electrode interface. In general, electrodes for providing this interface have consisted of a porous material, such as porous nickel or carbon, which acts as a barrier to electrolyte on one side and permits the passage of gas into its interior from its other side. The common area where the gas, the electrolyte, and the electrode meet is the reaction zone.

For good cell performance, the reaction zone on the electrode should lie along the face of the electrode adjacent the body of electrolyte and should cover as large an area as possible. If the electrode is extremely electrolyte-repellent, the area of the zone will be rather small due to poor contact between the electrolyte and the electrode. If the electrode is not electrolyte-repellent, the electrolyte will flood the pores of the electrode and "drown" the electrode. In this event, the reaction zone is at a point on the inside of the electrode, and a very small amount of rather immobile electrolyte is next to the reaction zone since the only electrolyte is that which fills the pores of the electrode. When this occurs, the ions formed by the cell reaction cannot readily escape from the reaction zone, and the cell performance drops. This buildup of ions in the reaction zone as well as the resultant decrease in cell performance is known as "concentration polarization."

The prior art has been concerned with this problem of maintaining the reaction zone near the surface of the electrode adjacent the electrolyte, but not repelling the electrolyte entirely, and many references will be found on the subject. It is believed, however, that an electrode construction which maintains the reaction zone in the proper place has not been found prior to this invention.

The main object of this invention, therefore, is to provide a practical and workable fuel cell.

Another object is to provide a fuel cell electrode construction which is resistant to electrode flooding, but which at the same time is not too repellent to a liquid electrolyte.

Broadly, the above objects are achieved by a fuel cell electrode construction comprising a gas-permeable electrolyte-repellent electrode having a layer of a substantially electrolyte-insoluble semipermeable material over substantially all the electrode surface to be adjacent a liquid electrolyte. As used herein, the term "semipermeable material" may be considered as a material which becomes wet with a liquid in contact with it, which allows ions of reaction to pass through it, but which does not allow the liquid to flow through it to a substantial degree.

The layer of semipermeable material on the electrode face performs several functions, one of which is that a reaction zone of large area is provided since the electrolyte wets the semipermeable material, thereby reaching the electrode and providing a three-phase area, or reaction zone, of the gas, electrolyte, and electrode. On the other hand, however, the semipermeable material retards the electrolyte from entering the pores of the electrode and thereby drowning the electrode. In addition, an electrode having this layer of semipermeable material can be made extremely electrolyte-repellent without reducing the area of the reaction zone, since the semipermeable material keeps the electrolyte in contact with the electrode even in opposition to forces of surface tension. Obviously, an extremely repellent electrode will have less tendency to drown than those of less repellency.

The semipermeable layer also performs other functions. The layer assures a more uniform gas distribution on the active electrode surface, retards peroxide ions produced at an oxygen electrode from harming a hydrogen electrode, and in some instances retards the dissolution of a catalyst into the electrolyte.

Figure 1:
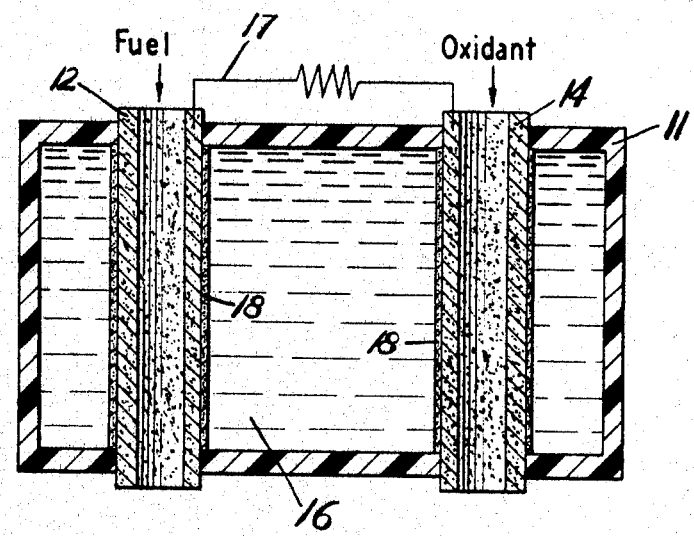
FIG. 1 is a cross-sectional view of a fuel cell embodying the invention.

Referring to the drawing, FIG. 1 shows a cross-sectional view of a fuel cell comprising a container 11 holding two tubular electrodes 12 (positive) and 14 (negative) made in accordance with the invention. An electrolyte 16 fills the inside of the container 11, and surrounds the outside surfaces of the electrodes 12 and 14, thereby providing an electrochemically conductive path between the two electrodes. An external circuit 17 electrically connects the electrodes 12 and 14. The interior of electrode 12 is supplied with a gaseous fuel, such as hydrogen, and the interior of electrode 14 is supplied with a gaseous oxidant, such as oxygen. With hydrogen and oxygen as the fuel and oxident respectively, the electrolyte 16 is suitably composed of an aqueous solution of potassium hydroxide. With hydrogen and chlorine, an electrolyte consisting of an aqueous solution of hydrochloric acid is preferred.

Electrodes 12 and 14 may be made of any suitable material which is sufficiently inert in the cell environment, which is reasonably electrically conductive, and which provides a support on which the electrochemical reactions can occur. It has been found that carbon fits these requirements very well, although nickel and other materials will also suffice. Moreover, the electrodes may have catalysts, such as the platinum metals, iron, nickel, and spinels, deposited thereon for promoting the electrochemical reactions.

In addition, the electrodes 12 and 14 must be gas permeable in order to permit the gas to reach the area where the electrode and electrolyte meet, but the electrodes must not be so porous that the electrolyte readily passes through. Porosities of 30 to 35 percent have been found to be desirable. The porous electrodes may be made by sintering particulate materials together, or by any other processes known in the art, e.g., molding or extruding carbon.

The electrodes 12 and 14 should also be repellent to the electrolyte 16 in order to keep the electrolyte out of the inner part of the electrodes. In some instances, the electrode material itself, is sufficiently electrolyte-repellent, but with some electrode materials, a repellent material, such as paraffin, should be deposited on the electrode face to render the electrode electrolyte-repellent. Such techniques are known in the art.

In accordance with the invention, a layer 18 of a substantially electrolyte-insoluble semipermeable material covers each surface of the electrodes 12 and 14 which is adjacent to the electrolyte 16. The layer 18 may be suitably made of sodium-carboxymethyl-cellulose, polyvinylalcohol, minutely porous rubber, acetyl cellulose, or mixtures thereof. Other suitable materials will be apparent to those in the art. Sodium-carboxymethyl-cellulose, however, has been found to be the preferred material, especially in hydrogen-oxygen fuel cells.

Figure 2:
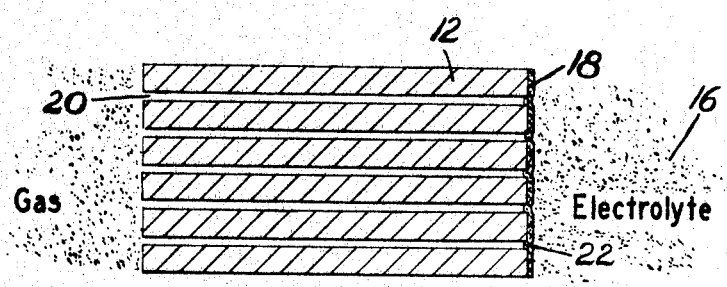
FIG. 2 is a greatly enlarged schematic view in cross-section of one electrode in the cell in FIG. 1.

Referring to FIG. 2, which is an enlarged schematic view of the electrode 12 and which is also representative of the electrode 14, the layer 18 covers the surface of the electrode 12 adjacent to the electrolyte 16, and preferably enters the pores 20 of the electrode 12 in a very minor amount, as shown in the drawing. This structure will usually occur naturally when the layer 18 is placed on the electrode 12. In this construction, a large reaction zone is provided at the area 22 which is common to the electrode 12, the gas in the pores 20, and the inner surface of layer 18 which is wet with the electrolyte 16. At the same time, however, the layer 18 helps keep the electrolyte 16 out of the pores 20. The above construction is preferable to a merely electrolyte-repellent electrode since an extremely electrolyte-repellent electrode will prevent any electrolyte from entering the electrode pores, thereby reducing the area of the reaction zone.

In some instances, especially with regard to cathodes, it has been found that the layer 18 may dissolve into the electrolyte 16 because of the action of hydrogen peroxide after the cell has been operated for a time. Even in such a case, however, it was found that the layer 18 provides a beneficial action in that the current is distributed to many active centers, thereby preventing local overloading of spots in the reaction zone. Under these circumstances, the semipermeable material constituting the layer 18 functions as a depth-limited wetting agent, thus reducing the electrode repellency in the top layer of the electrode and thereby causing a uniformly loaded surface. In addition, the layer 18 prevents gas bubbles from entering the electrolyte 16 through any of the pores 20 having large orifices not properly blocked by the electrolyte.

The processing of typical carbon electrodes for hydrogen or for oxygen or chlorine follows:

Carbon shells are suitably made of 100 parts of finely divided carbon black, 63 parts soft pitch and 3 parts fuel oil; these are then baked at 1000° C. for 6 hours. The raw tubes have a porosity in the order of 18 to 20 percent (measured by water saturation). Porosity of the tubes is then increased to about 25 percent by heating at 850° to 950° C. in a $CO_2$ atmosphere or steam for several hours.

Next, the catalyst solution, which is preferably a 0.1 M solution of cobaltous nitrate $[Co(NO_3)_2 \cdot 6H_2O]$ and aluminum nitrate $[Al(NO_3)_3 \cdot 9H_2O]$ is applied to the electrodes and decomposed by heat to form a spinel, $CoO \cdot Al_2O_3$, on the carbon surfaces. This step not only provides a catalyst for certain reactions, but also produces nitrogen oxides during the nitrate decomposition which oxidize the electrodes and thereby increase the porosity of the electrodes to the desired 30 to 35 percent range. Thus, this step is generally included in the processing of chlorine electrodes as well as hydrogen and oxygen electrodes, although chlorine electrodes do not need to be catalyzed ordinarily.

The nitrates are preferably decomposed by heating in a carbon dioxide atmosphere at a temperature between about 850° C. and 950° C. Processes for impregnating porous carbon are described in greater detail and claimed in patents to A. Marko and K. Kordesch, U.S. 2,615,932 and 2,669,598, which issued on Oct. 28, 1952, and Feb. 16, 1954, respectively. Many other heavy metal oxides would serve substantially the same purpose, but the cobalt-aluminum oxide (spinel) catalyst is preferred generally because of its insolubility in caustic electrolyte. Furthermore, heat-decomposable salts other than nitrates will suffice.

The preferred catalysts may be defined as consisting of the pyrolysis product of a heat-decomposable heavy metal salt and of an aluminum salt. Besides salts of cobalt, other heavy metal salts include those of iron, nickel, manganese, chromium, copper, silver, gold, platinum, vanadium, titanium, uranium, thorium, and the rare earths.

At this point the preparation of the electrodes differs in that the hydrogen electrodes should be coated with a suitable hydrogen catalyst, such as platinum or rhodium. A 10 percent aqueous solution of chloroplatinic acid $(H_2PtCl_6 \cdot 6H_2O)$ or of rhodium trichloride $(RhCl_3)$ is painted on the electrode surface, and is thermally decomposed to platinum or rhodium metal at a temperature below about 200° C. In this regard, the presence of the spinel previously deposited is advantageous since the spinels appear to promote the decomposition of the platinum family metal salts at such low temperatures. Ten milliliters of such a solution are necessary to produce a (calculated) surface coverage of 2 mg. of the metal per $cm.^2$ on a 12-inch electrode. This particular concentration (2 $mg./cm.^2$) was selected on the basis of data showing that the performance of the hydrogen electrode varied with the amount of platinum deposited on the carbon surface. The range of ¼ to 8 mg. per cm. squared appeared critical, and a definite maximum was observed at the 2 mg. per square centimeter concentration level. The same sort of behavior has been observed for rhodium.

The action of the hydrogen catalyst, platinum in the above case, is to dissolve the hydrogen in the atomic state and to cause hydrogen ions to form in contact with the electrolyte. Other transition metals from Group VIII, particularly the platinum family metals, including palladium, iridium, ruthenium, and osmium, also promote fast hydrogen ionization at room temperature. Iron and nickel are suitable catalysts for this purpose, but perform best only at high temperatures. Of the elements listed, rhodium has the distinct advantage of not being poisoned by sulfur compounds or by cyanides. In fact, increased catalytic efficiency for this metal has been observed in the presence of sulfur and in the presence of oxygen. This fact adds considerably to its usefulness here, since contaminants are often introduced in the manufacture and use of carbon electrodes. Introduction of sulfur can occur in the gas baking process from the interior of the baking furnace, from puffing inhibitors or through the use of high ash content carbon. Cyanide contamination can result from the silver plating process for the metal connecting parts or from the gas used as the fuel.

The electrodes are also treated to increase their repellency to electrolyte. The repellency treatment consists of: (1) electrode immersion in a solution of 1½ percent by weight paraffin in petroleum ether followed by air drying, and (2) the application of kerosene (B.P. 200° C. to 250° C.) to the inner tubular surfaces of the electrodes. Care must be taken that kerosene is not applied to the outer electrode surface, since high polarization may result.

Next, the outer surfaces of the electrodes are coated with a two percent by weight aqueous solution of sodium-carboxymethyl-cellulose followed by a mild drying operation to obtain the semipermeable material on the electrode surface. The viscosity of the solution may be adjusted to keep the solution from entering the electrode pores too far. An aqueous solution of polyvinyl alcohol, a benzene solution of rubber, or an acetone solution of acetyl cellulose may be used instead of the aqueous solution of sodium-carboxymethyl-cellulose. Heavy metal catalysts seem to stabilize sodium-carboxymethyl-cellulose on the electrode surface by forming an electrolyte-insoluble complex with the cellulose material; therefore, sodium-carboxymethyl-cellulose is the preferred semi-permeable material. It was also found that a mixture of sodium-carboxymethyl-cellulose and methylcellulose produces a more stable film than sodium-carboxymethyl-cellulose alone, especially on carbon electrodes having a velvet black (dusty) surface.

Hydrogen-oxygen systems each having two tubular electrodes and operating experimentally for eight hours daily have been in operation for two years, and their performance characteristics have not changed appreciably when compared with the performance of newly assembled cells. The cells in question have an electrode area of about 40 square centimeters, and operate at an average current density of 10 milliamperes per square centimeter. The electrolyte employed was a 15 N solution of potassium hydroxide. The operating temperature of the cells was in the range 50° C. to 60° C., and at rest the cells were at room temperature. Under a 400-milliampere load, the cells when first assembled had a voltage of 0.84 volt. After eleven months, the voltage produced under the same conditions was 0.78 volt, and after twenty months of experimental operation, the voltage observed was 0.76 volt.

Carbon plate cells, made from the same material and catalyzed and wetproofed as described above, have also been tested. In one case, 5700 hours of continuous service at 25 ma./cm.$^2$ were obtained at a voltage of 0.85 to 0.75 volt in 9 N NaOH at 60° C. In another instance, 2700 hours of continuous service were obtained at 50 ma./Cm.$^2$, 0.95 to 0.80 volt, in 12 N KOH at 45° C.

Hydrogen-chlorine cells have also been successfully tested. The open-circuit voltage of this system is about 1.3 volts in 4 N/HCl compared to a maximum open-circuit voltage of about 1 volt for the hydrogen-oxygen system in 12 to 15 M KOH. Very small polarization occurs under load. At room temperature and atmospheric pressure, 10 ma./cm.$^2$ were obtained with a two electrode design at 1.25 volts, 20 ma./cm.$^2$ at 1.22 volts, 30 ma./cm.$^2$ at 1.20 volts, 50 ma./cm.$^2$ at 1.15 volts, and 100 ma./cm.$^2$ at 1.10 volts. The last figure represents a current density ten times as high as that obtainable from the hydrogen-oxygen fuel cell system (10–20 ma./cm.$^2$) under comparable conditions. Also, the closed circuit voltage in the hydrogen-oxygen fuel cell under those conditions is only 0.8 volt compared to 1.10 volts for the present system. Thus it is advantageous to use the hydrogen-chlorine fuel cell system for high-current, short-life applications for which it is apparently better suited than the hydrogen-oxygen system.

What is claimed is:

1. In a fuel cell having a liquid electrolyte and at least two electrodes in contact therewith for electrochemically reacting a fuel and an oxidant, at least one such electrode comprising a gas-permeable electrolyte-repellent electrode for establishing a gas-electrolyte-electrode interface and having a layer of a material selected from the group consisting of sodium carboxymethyl cellulose, acetyl cellulose, polyvinylalcohol, and minutely porous rubber over substantially all the electrode surface in contact with said electrolyte.

2. The fuel cell defined in claim 1 wherein said gas-permeable electrolyte-repellent electrode is made of carbon.

3. The fuel cell defined in claim 1 wherein said material is sodium carboxymethyl cellulose.

4. A hydrogen-oxygen fuel cell for producing electricity by the electrochemical combination of hydrogen and oxygen gases, which cell comprises a container; an alkaline electrolyte in said container; at least one gas-permeable electrolyte-repellent hydrogen electrode in said container and in contact with said electrolyte, said hydrogen electrode having at least on its surface in contact with said electrolyte a hydrogen ionization catalyst thereon and a layer of a material selected from the group consisting of sodium carboxymethyl cellulose, acetyl cellulose, polyvinylalcohol, and minutely porous rubber thereover; at least one gas-permeable electrolyte-repellent oxygen electrode in said container and in contact with said electrolyte, said oxygen electrode having at least on its surface in contact with said electrolyte the pyrolysis product of a heat-decomposable metallic salt and an aluminum salt thereon and a layer of a material selected from the group consisting of sodium carboxymethyl cellulose, acetyl cellulose, polyvinylalcohol, and minutely porous rubber thereover; gas inlet and outlet means for said electrodes; and current collecting means associated with each of said electrodes.

5. The cell defined in claim 4 wherein said hydrogen and oxygen electrodes are composed of carbon and have a porosity of 30 to 35 percent.

6. The cell defined in claim 4 wherein said hydrogen ionization catalyst is selected from the group consisting of platinum, rhodium, palladium, iridium, ruthenium, osmium, and mixtures thereof.

7. The cell defined in claim 4 wherein said hydrogen electrode has from ¼ to 8 milligrams per square centimeter of hydrogen ionization catalyst therein.

8. The cell defined in claim 4 wherein said metallic salt is a salt of at least one of the group consisting of iron, cobalt, nickel, manganese, chromium, copper, silver, gold, platinum, vanadium, titanium, uranium, throrium, and the rare earths.

9. A hydrogen-chlorine fuel cell for producing electricity by the electrochemical combination of hydrogen and chlorine gases, which cell comprises a container; an acid electrolyte in said container; at least one gas-permeable electrolyte-repellent hydrogen electrode in said container and in contact with said electrolyte, said hydrogen electrode having at least on the surface in contact with said electrolyte a hydrogen dissociation catalyst thereon and a layer of a material selected from the group consisting of sodium carboxymethyl cellulose, acetyl cellulose, polyvinylalcohol, and minutely porous rubber thereover; at least one gas-permeable electrolyte-repellent chlorine electrode in said container and in contact with said electrolyte; gas inlet and outlet means for said electrodes; and current collecting means associated with said electrodes.

10. The cell defined in claim 9 wherein said hydrogen and chlorine electrodes are composed of carbon and have a porosity of 30 to 35 percent.

11. The cell defined in claim 9 wherein said hydrogen dissociation catalyst is selected from the group consisting of platinum, rhodium, palladium, iridium, ruthenium, osmium, and mixtures thereof.

12. The cell defined in claim 9 wherein said hydrogen electrode has from ¼ to 8 milligrams per square centimeter of hydrogen dissociation catalyst thereon.

13. The cell defined in claim 9 wherein said chlorine electrode has at least on its surface in contact with said electrolyte the pyrolysis product of a heat-decomposable metallic salt and an aluminum salt on the surface thereof.

References Cited

UNITED STATES PATENTS

| | | | |
|---|---|---|---|
| 2,275,281 | 3/1942 | Berl | 136—86.2 |
| 2,938,064 | 5/1960 | Kordesch | 136—86 |
| 3,097,116 | 7/1963 | Moos | 136—120 |

FOREIGN PATENTS 233,847  9/1959  Australia.

WINSTON A. DOUGLAS, Primary Examiner

HUGH A. FEELEY, Assistant Examiner

U.S. Cl. X.R.

136—120, 121